US009781536B2

(12) United States Patent
Chang et al.

(10) Patent No.: US 9,781,536 B2
(45) Date of Patent: Oct. 3, 2017

(54) AUDIO-DATA TRANSMISSION SYSTEM AND AUDIO-DATA TRANSMISSION METHOD

(71) Applicant: Acer Incorporated, New Taipei (TW)

(72) Inventors: Kai-Ping Chang, New Taipei (TW);
Wen-Cheng Hsu, New Taipei (TW);
Chi-Hung Chang, New Taipei (TW);
Chia-Hsun Lee, New Taipei (TW);
Shih-Hao Lin, New Taipei (TW)

(73) Assignee: ACER INCORPORATED, New Taipei (TW)

( * ) Notice: Subject to any disclaimer, the term of this patent is extended or adjusted under 35 U.S.C. 154(b) by 101 days.

(21) Appl. No.: 14/663,795

(22) Filed: Mar. 20, 2015

(65) Prior Publication Data
US 2015/0317984 A1    Nov. 5, 2015

(30) Foreign Application Priority Data

May 5, 2014    (TW) .............................. 103115915 A

(51) Int. Cl.
*H04S 3/02*    (2006.01)
*H04B 11/00*    (2006.01)

(52) U.S. Cl.
CPC .............. *H04S 3/02* (2013.01); *H04B 11/00* (2013.01)

(58) Field of Classification Search
None
See application file for complete search history.

(56) References Cited

U.S. PATENT DOCUMENTS

| 6,628,724 B2 | 9/2003 | Bannasch et al. |
| 8,451,882 B2 | 5/2013 | Matsuoka |
| 8,498,860 B2 | 7/2013 | Matsuoka |
| 8,594,340 B2 | 11/2013 | Takara et al. |

(Continued)

FOREIGN PATENT DOCUMENTS

| CN | 1329782 A | 1/2002 |
| CN | 101218768 A | 7/2008 |

(Continued)

OTHER PUBLICATIONS

EP Search Report dated Oct. 2, 2015 in corresponding EP application (No. 15165679.0-1860).

(Continued)

*Primary Examiner* — Paul Huber
(74) *Attorney, Agent, or Firm* — McClure, Qualey & Rodack, LLP

(57) ABSTRACT

The present invention provides an audio-data transmission system including a channel encoder, a data modulator and a speaker. The channel encoder is utilized to receive and encode a bit signal and generates an encoding signal. The data modulator is utilized to receive the encoding signal and modulates it to an audio signal whose frequency is on a frequency band. The audio signal includes at least four different sub-audio signals. The frequency band includes at least four sub-frequency bands with different frequencies. The frequencies of the at least four sub-audio signals are respectively on the at least four sub-frequency bands. The speaker is utilized to transmit the audio signal including the at least four different sub-audio signals.

14 Claims, 8 Drawing Sheets

(56) References Cited

U.S. PATENT DOCUMENTS

| | | | | |
|---|---|---|---|---|
| 2009/0067292 A1* | 3/2009 | Matsuoka | ............ | H04B 7/0613 |
| | | | | 367/137 |
| 2011/0122959 A1* | 5/2011 | Matsuoka | ........... | H04L 27/2627 |
| | | | | 375/260 |
| 2014/0104990 A1* | 4/2014 | Shim | ...................... | H04B 11/00 |
| | | | | 367/197 |

FOREIGN PATENT DOCUMENTS

| | | | |
|---|---|---|---|
| CN | 101390315 A | 3/2009 |
| CN | 101873177 A | 10/2010 |
| CN | 102138294 A | 7/2011 |
| CN | 102611658 A | 7/2012 |
| CN | 102812651 A | 12/2012 |
| EP | 1998476 A1 | 12/2008 |
| EP | 2328290 A1 | 6/2011 |
| EP | 2723005 A1 | 4/2014 |

OTHER PUBLICATIONS

Chinese language office action dated Jul. 26, 2017, issued in application No. CN 201410333587.8.

\* cited by examiner

AUDIO-DATA TRANSMISSION SYSTEM AND AUDIO-DATA TRANSMISSION METHOD

CROSS REFERENCE TO RELATED APPLICATIONS

This Application claims priority of Taiwan Patent Application No. 103115915 filed on May 5, 2014, the entirety of which is incorporated by reference herein.

BACKGROUND OF THE INVENTION

Field of the Invention

The invention relates to an audio-data transmitting system and an audio-data transmitting method, especially to an audio-data transmitting system and an audio-data transmitting method for error detecting and frequency modulating.

Description of the Related Art

As the portable electronic devices become more popular, modern people have a greater tendency to depending on the audio-data transmission. Generally, the audio-data transmission method includes the frequency modulation and the phase modulation. The frequency modulation method utilizes sounds of different frequencies to represent different data, and the phase modulation method utilizes sound of different phases to represent different data.

However, only one data can be transmitted in a unit of time by the frequency modulation and the phase modulation, therefore, the transmission speed is not high. In addition, the phase modulation is easily affected by multiple channels and the non-synchronous transmission, and the error of data transmission occurs. Therefore, an audio-data transmitting system and an audio-data transmitting method are needed to improve the data transmission speed and improve the accuracy and security of data transmission.

BRIEF SUMMARY OF THE INVENTION

The present invention provides an audio-data transmitting system including a channel encoder, a data modulator, and a speaker. The channel encoder is utilized to receive and encode a bit signal for generating an encoding signal. The data modulator is utilized to receive the encoding signal and modulate the encoding signal to become an audio signal whose frequency is on a frequency band. The audio signal includes at least four different sub-audio signals, the frequency band includes at least four different sub-frequency bands of different frequencies, and the frequencies of the at least four sub-audio signals are on the at least four sub-frequency bands respectively. The speaker is utilized to play the audio signal which includes the at least four different sub-audio signals simultaneously.

The present invention provides an audio-data transmitting method which includes receiving and encoding a bit signal for generating an encoding signal; receiving the encoding signal; modulating the encoding signal to become an audio signal whose frequency is on a frequency band; and playing the audio signal which includes at least four different sub-audio signals simultaneously. The audio signal includes at least four different sub-audio signals, the frequency band includes at least four different sub-frequency bands of different frequencies, and the frequencies of the at least four sub-audio signals are on the at least four sub-frequency bands respectively.

The present invention provides an audio-data transmitting system including a microphone, a data demodulator and a channel encoder. The microphone is utilized to receive an audio signal whose frequency is on a frequency band. The audio signal includes at least four different sub-audio signals, the frequency band includes at least four different sub-frequency bands of different frequencies, and the frequencies of the at least four sub-audio signals are on the at least four sub-frequency bands respectively. The data demodulator is coupled to the microphone for demodulating the audio signal to become an encoding signal according to frequencies of the at least four sub-audio signals. The channel encoder is utilized to receive and decode the encoding signal for generating a bit signal.

The present invention provides an audio-data transmitting method which includes receiving an audio signal whose frequency is on a frequency band; demodulating the audio signal to become an encoding signal according to frequencies of the at least four sub-audio signals; and receiving and decoding the encoding signal for generating a bit signal. The audio signal includes at least four different sub-audio signals, the frequency band includes at least four different sub-frequency bands of different frequencies, and the frequencies of the at least four sub-audio signals are on the at least four sub-frequency bands respectively.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

In order to illustrate the purposes, features and advantages of the invention, the embodiments and figures of the invention are shown in detail as follows. This description is made for the purpose of illustrating the general principles of the invention and should not be taken in a limiting sense. It should be understood that the embodiments may be realized in software, hardware, firmware, or any combination thereof.

Figure 1A:
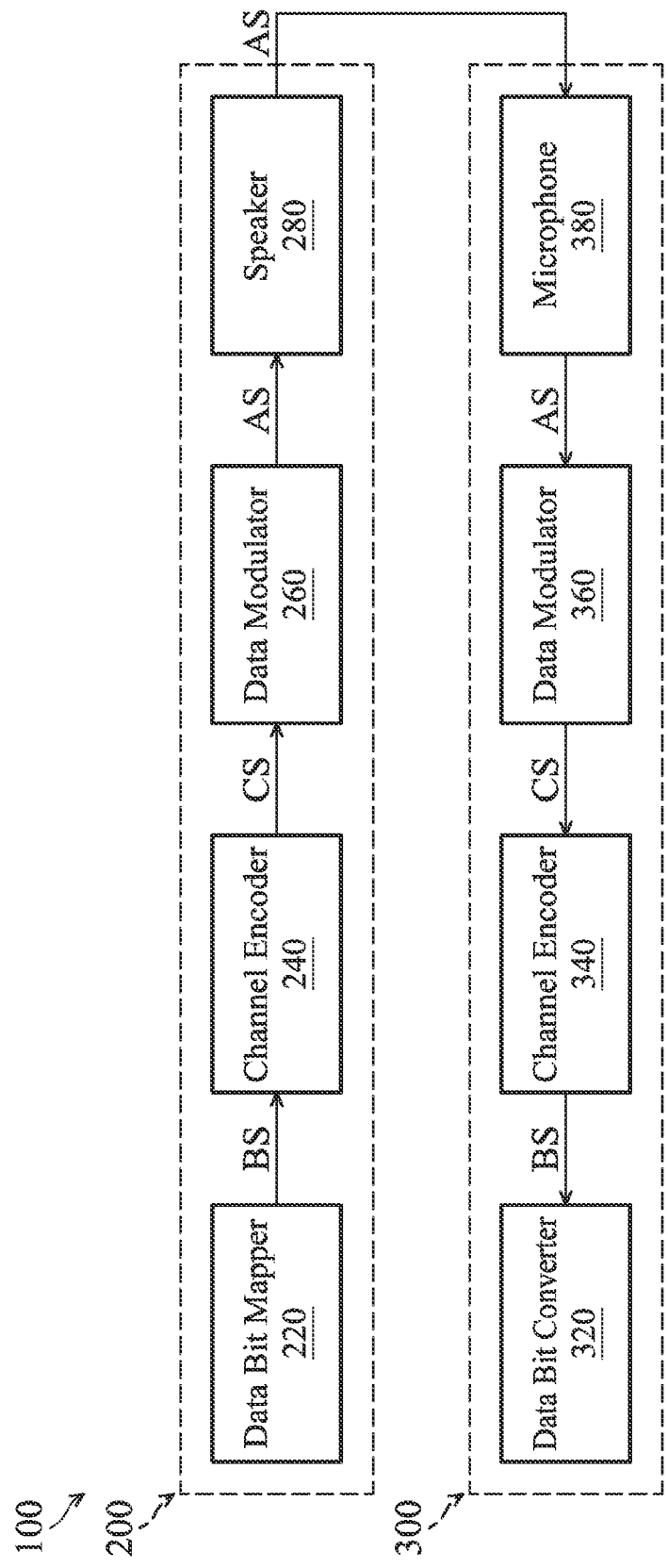
FIG. 1A is a schematic diagram illustrating an audio-data transmitting system according to an embodiment of the invention.

FIG. 1A is a schematic diagram illustrating an audio-data transmitting system 100 according to an embodiment of the invention. In one embodiment, the audio-data transmitting system 100 includes a first electronic device 200 and a second electronic device 300. For example, the first electronic device 200 is the transmitting terminal of the audio-data transmitting system 100, and the second electronic device 300 is the receiving terminal of the audio-data transmitting system 100. The first electronic device 200 includes a data bit mapper 220, a channel encoder 240, a data modulator 260 and a speaker 280. The second electronic device 300 includes a data bit converter 320, a channel decoder 340, a data demodulator 360 and a microphone 380. For example, the first electronic device 200 and the second electronic device 300 could be devices which provide wireless network service such as a network server, a cell phone, a desktop computer, a laptop computer or a tablet computer, and are not limited thereto. In addition, in another embodiment, the first electronic device 200 and the second electronic device 300 could be integrated in the same electronic device to be the receiving terminal and/or transmitting terminal of another electronic device.

Figure 1B:
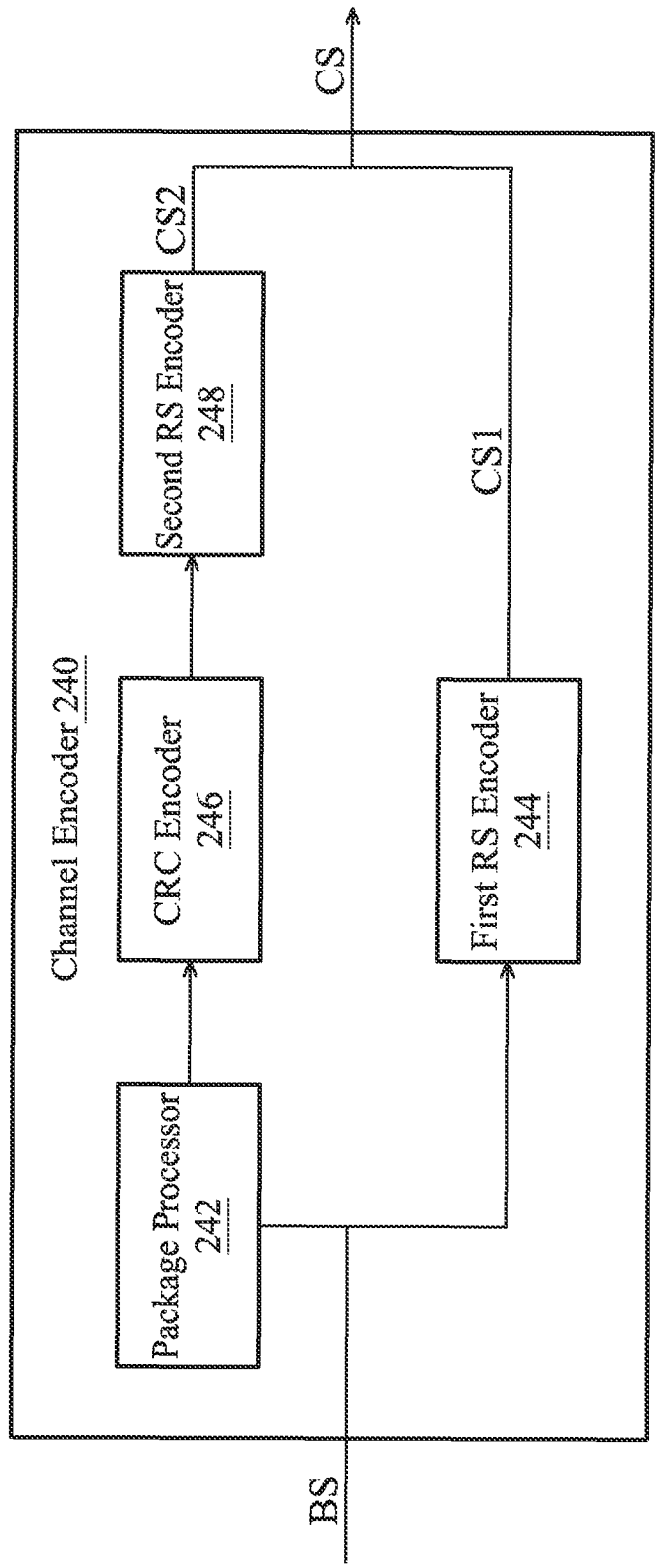
FIG. 1B is a schematic diagram illustrating a channel encoder according to an embodiment of the invention.

Specifically, the data bit mapper 220 is utilized for mapping or converting an original data signal into a bit signal BS. Afterwards, the channel encoder 240 receives the bit signal BS and encodes it to generate an encoding signal CS. FIG. 1B is a schematic diagram illustrating the channel encoder 240 according to an embodiment of the invention. As shown in FIG. 1B, the channel encoder 240 includes a package processor 242, a first Reed-Solomon (RS) encoder 244, a cyclic redundancy check (CRC) encoder 246 and a second RS encoder 248. The package processor 242 is utilized to process or analyze the original data signal included by the bit signal BS for obtaining the package data signal relating to the original data signal, such as the transmission type, the data type, the data size and whether it is an entire package or not. For example, the size of the package information signal is 12 bits which include 2 bits for indicating the transmission type such as broadcasting or acknowledging, 3 bits for indicating the data type such as the mac address, 6 bits for indicating the data size of the original data signal and 1 bit for indicating whether it is an entire package or not.

As shown in FIG. 1B, in one embodiment, the bit signal is directly transmitted to the first RS encoder 244, and the first RS encoder 244 is utilized by the channel encoder 240 for generating the first encoding signal CS1. In addition, the package processor 242 transmits the package information signal to the CRC encoder 246, and generates the second encoding signal CS2 through the CRC encoder 246 and the second RS encoder 248. In other words, the encoding signal CS output by the channel encoder 240 includes a first encoding signal CS1 which represents the original data signal and a second encoding signal CS2 which represents the package type of the original data signal. Therefore, the error detection and the error correction of the bit or symbol are executed by the channel encoder 240, and the effect of the audio-data transmitting system 100 caused by the noise of the channel could be decreased accordingly.

For example, the CRC encoder 246 is CRC-6 encoding, and the second RS encoder 248 is the encoding which shortens the RS(7,5,2) into RS(6,4,2). Therefore, the size of the package information signal is 12 bits, and each of the CRC encoder 246 and the second RS encoder 248 adds 6-bit encoding respectively to generate the second encoding signal CS2 of 24 bits. In addition, the first RS encoder 244 is the encoding which shortens the RS(64,51,12) into RS(24, 12,12). When the original data signal is 9 bytes, the first encoding signal CS1 output by the first RS encoder 244 is 18 bytes. As such, since the RS encoding and the CRC encoding are utilized by the audio-data transmitting system of the present invention, the accuracy of data transmission, encoding and decoding is improved. In addition, because the second encoding signal CS2 includes important information of the original data, two error detecting and correcting mechanisms (RS encoding and CRC encoding) are utilized to strictly prevent the data missing and error. The accuracy of data transmission can be improved greatly by utilizing two error detecting and correcting mechanisms, and the following original data can be prevented from being stolen (since the original data must be demodulated completely by utilizing the second encoding signal CS2) to improve the security of data transmission. It should be noted that in the embodiments of the present invention, each functional unit (such as the first RS encoder 244 or the CRC encoder 246) could be composed of hardware and/or software components including a chip, a controller, a storage device and/or other necessary circuits. In addition, the bit number described in the above embodiments is for illustration, not for limiting the scope of the present invention thereto.

Figure 1C:
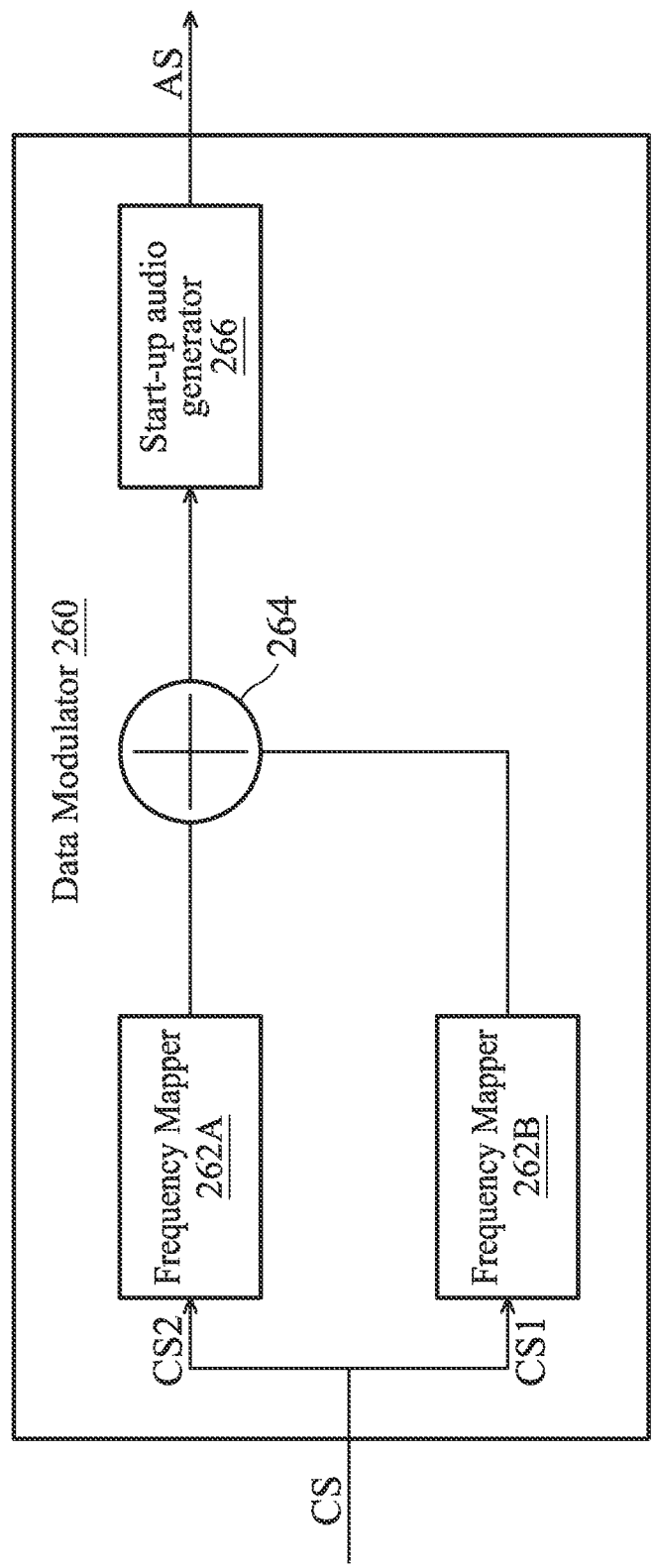
FIG. 1C is a schematic diagram illustrating a data modulator according to an embodiment of the invention.

FIG. 1C is a schematic diagram illustrating a data modulator 260 according to an embodiment of the invention. The data modulator 260 includes frequency mapper 262A and 262B, the adder 264 and the start-up audio generator 266. In one embodiment, the data modulator 260 receives the encoding signal CS (including the first encoding signal CS1 and the second encoding signal CS2), and converts the encoding signal CS into an audio signal AS whose frequency is on a frequency band. For example, the above frequency band is o the range about 18000 Hz to 20000 Hz. The frequency range can be played by the speaker 280, but cannot heart by human ears. Accordingly, users will not be bothered by it. It should be noted that the audio signal AS includes at least four different sub-audio signals, the frequency band includes at least four different sub-frequency bands of different frequencies, and the frequencies of the at least four sub-audio signals are on the at least four sub-frequency band respectively. Afterwards, the data modulator 260 transmits the audio signal AS to the speaker 280, and the speaker 280 plays the audio signal AS including at least four different sub-audio signals at the same time. In another embodiment, the speaker 280 simultaneously plays the four sub-audio signals about the second encoding signal CS2 at first, and simultaneously plays the four sub-audio signals about the second encoding signal CS2 afterwards.

Specifically, as shown in FIG. 1C, frequency mappers 262A and 262B respectively receive the second encoding signal CS2 and the first encoding signal CS1, execute the frequency mapping for modulation, and transmit to the adder 264 and the start-up audio generator 266 in sequence. The start-up audio generator 266 is utilized to generate an audio signal AS including a start-up audio signal. Specifically, the frequency of the start-up audio signal is on the first spacing frequency band which is different from the four sub-frequency bands of the four sub-audio signals. The modulation method of frequency mapping is illustrated as below.

TABLE 1

The modulating value of frequency mapping

| Frequency (Hz) | Bit Value | Band Type |
|---|---|---|
| 18000 | 000 | Sub-Frequency |
| 18046 | 001 | Band F1 |
| 18093 | 010 | |
| 18140 | 011 | |
| 18187 | 100 | |
| 18234 | 101 | |
| 18281 | 110 | |
| 18328 | 111 | |

TABLE 1-continued

The modulating value of frequency mapping

| Frequency (Hz) | Bit Value | Band Type |
|---|---|---|
| 18375 | X | Spacing Frequency |
| 18421 | X | Band X1 |
| 18468 | 000 | Sub-Frequency |
| 18515 | 001 | Band F2 |
| 18562 | 010 | |
| 18609 | 011 | |
| 18656 | 100 | |
| 18703 | 101 | |
| 18750 | 110 | |
| 18796 | 111 | |
| 18843 | X | Spacing Frequency |
| 18890 | X | Band X2 |
| 18937 | 000 | Sub-Frequency |
| 18984 | 001 | Band F3 |
| 19031 | 010 | |
| 19078 | 011 | |
| 19125 | 100 | |
| 19171 | 101 | |
| 19218 | 110 | |
| 19265 | 111 | |
| 19312 | X | Spacing Frequency |
| 19359 | X | Band X3 |
| 19406 | 000 | Sub-Frequency |
| 19453 | 001 | Band F4 |
| 19500 | 010 | |
| 19546 | 011 | |
| 19593 | 100 | |
| 19640 | 101 | |
| 19687 | 110 | |
| 19734 | 111 | |
| 19781 | X | Spacing Frequency |
| 19828 | X | Band X4 |
| 19875 | X | |
| 19921 | X | |
| 19968 | X | |

In one embodiment, frequency mappers 262A and 262B respectively execute the frequency mapping for the second encoding signal CS2 and the first encoding signal CS1. As shown in Table 1, the frequency mapper 262A and 262B maps or modulates the second encoding signal CS2 and the first encoding signal CS1 to the frequency band of 18000 Hz to 20000 Hz. The above frequency band includes four sub-frequency bands F1, F2, F3 and F4, and four spacing frequency bands X1, X2, X3 and X4. Each of the sub-frequency bands F1, F2, F3 and F4 includes eight frequencies to represent the bit value of a three-digit number (i.e. three bits), and the separation between each frequency is about 40 Hz to 50 Hz. For example, the sub-frequency band F1 includes eight frequencies such as 18000 Hz, 18046 Hz and 180893 Hz. The 18000 Hz represents a bit value of 000, the 18046 Hz represents a bit value of 001, and the 18093 Hz represents a bit value of 010. It should be noted that the four spacing frequency bands X1, X2, X3 and X4 are used for buffering to distinctly define the frequency range of each of the sub-frequency bands F1, F2, F3 and F4 for reducing the error rate of signal transmission. Therefore, the four sub-frequency bands F1, F2, F3 and F4 and the four spacing frequency bands X1, X2, X3 and X4 are interlaced with each other so that each of the four sub-frequency bands F1, F2, F3 and F4 will not be adjacent to each other.

Specifically, each frequency of the four sub-frequency bands represent three bits, therefore, the four sub-frequency bands F1, F2, F3 and F4 could generate data of 12 bits simultaneously within a unit of time. Compared to transmitting data of only one frequency within a unit of time, the present invention provides an audio-data transmitting method for transmitting data of four frequencies within a unit of time and provides a higher speed for data transmission. In one embodiment, the frequency of the start-up audio signal is in one of the four spacing frequency bands X1, X2, X3 and X4. In another embodiment, a control audio signal is generated by the data modulator 260 for multiple accessing and preventing sound collision. The audio signal AS output by the data modulator 260 also includes the control audio signal whose frequency is in one of the four spacing frequency bands X1, X2, X3 and X4. It should be noted that the start-up audio signal and the control audio signal are in different spacing frequency bands. For example, the control audio signal is in the spacing frequency band X4 of the highest frequency. The three highest frequencies (i.e. 19875 Hz, 19921 Hz and 19968 Hz) of the spacing frequency band X4 is utilized for the control audio signal.

Figure 1D:
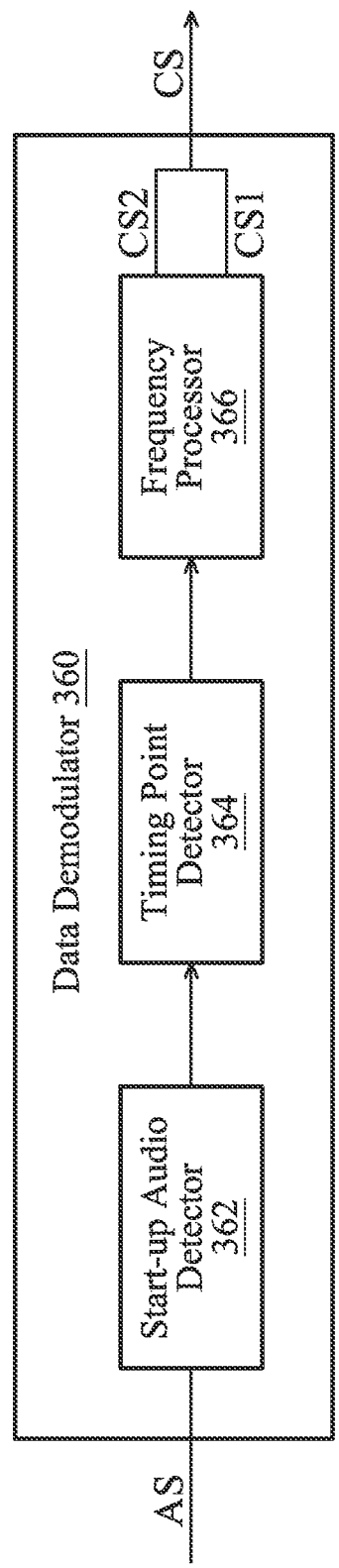
FIG. 1D is a schematic diagram illustrating a data demodulator according to an embodiment of the invention.

FIG. 1D is a schematic diagram illustrating a data demodulator 360 according to an embodiment of the invention. The data demodulator 360 includes a start-up audio detector 362, a timing point detector 364 and a frequency processor 366. In one embodiment, the data demodulator 360 receives the audio signal AS from the microphone 380, and decodes the audio signal AS into the encoding signal CS according to the frequencies of the at least four sub-audio signals included by the audio signal AS. Specifically, the start-up audio detector 362 is utilized to detect the start-up audio signal within the audio signal AS. The timing point detector 364 is utilized to detect the timing point (preamble) of the audio signal AS for determining the unit of time for transmitting the bit value of specific frequencies. Once the timing point detector 364 detects the timing point, the frequency processor 366 analyzes or determines the specific frequencies within each of the sub-frequency bands F1, F2, F3 and F4 for demodulating the first encoding signal CS1 and the second encoding signal CS2.

Figure 1E:
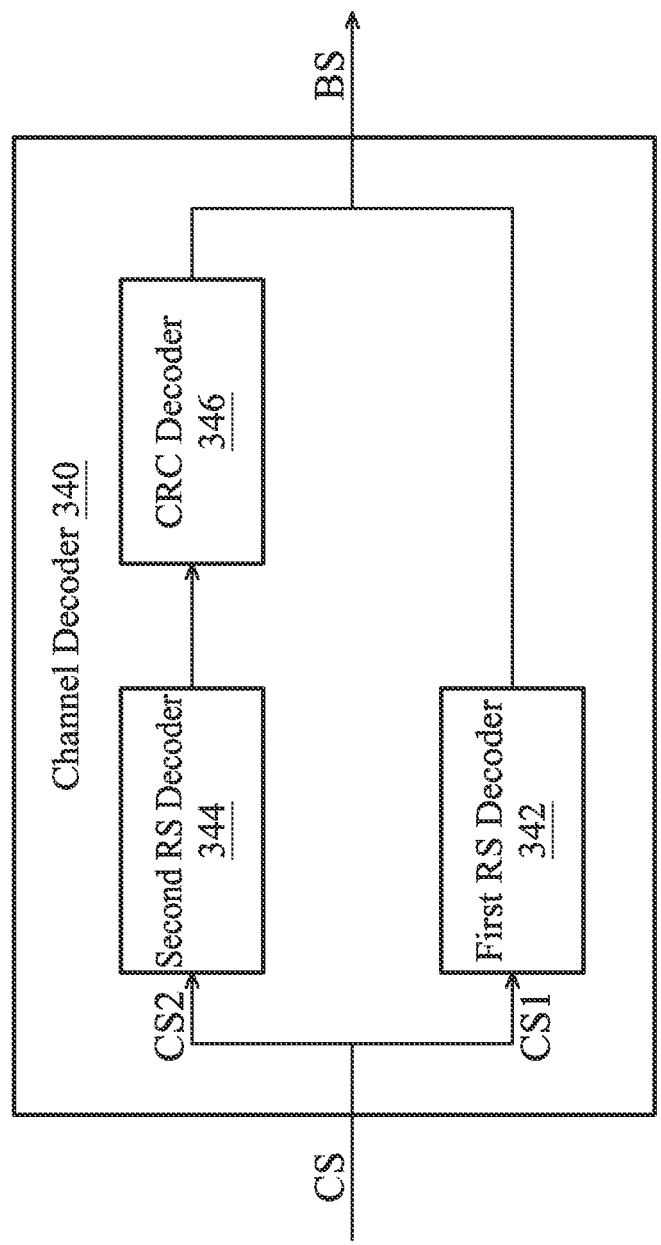
FIG. 1E is a schematic diagram illustrating a channel decoder according to an embodiment of the invention.

FIG. 1E is a schematic diagram illustrating a channel decoder 340 according to an embodiment of the invention. In one embodiment, the channel decoder 340 receives and decodes the encoding signal CS output by the data demodulator 360 and generates the bit signal BS. The channel decoder 340 includes the first RS decoder 342, the second RS decoder 344 and the CRC decoder 346. The first RS decoder 342 is utilized to decode the first encoding signal CS1, the second RS decoder 344 and the CRC decoder 346 are utilized to decode the second encoding signal CS2, and the bit signal BS is finally generated. For example, the CRC decoder 346 is the CRC-6 decoding, and the second RS decoder 344 is the decoding for shortening the RS(7,5,2) into RS(6,4,2). Therefore, as shown in FIG. 1, after the second encoding signal CS2 of 24 bits has been decoded by the second RS decoder 344 and the CRC decoder 346, it becomes the package information signal of 12 bits. In addition, the first RS decoder 342 is the decoding for shortening the RS(64,51,12) into RS(24,12,12). The first encoding signal CS1 is decoded by the first RS decoder 342 and becomes the original data signal of 9 bytes. Therefore, since the RS encoding and the CRC encoding are utilized by the audio-data transmitting system of the present invention, the accuracy of data transmission, encoding, and decoding are improved.

Figure 2:
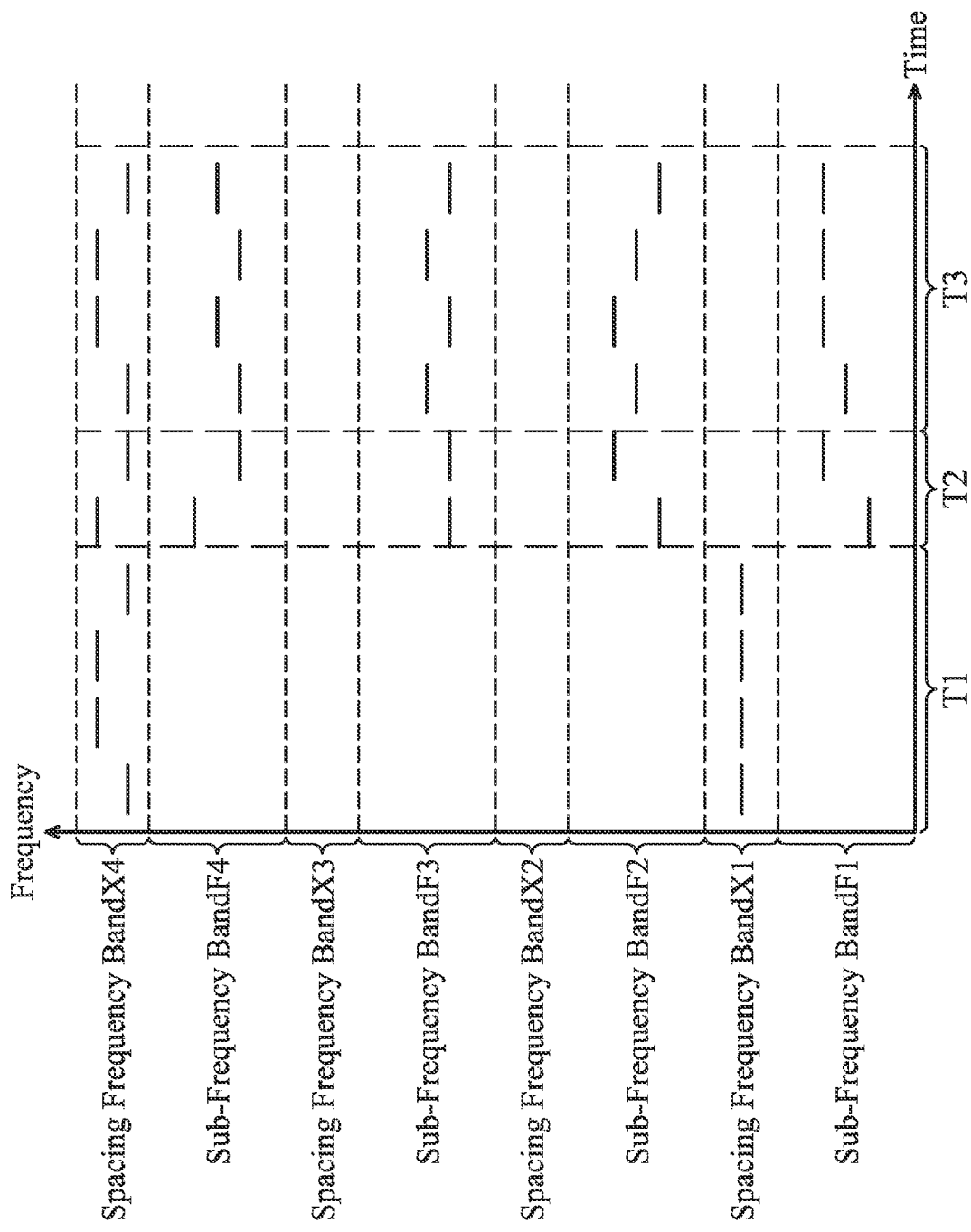
FIG. 2 is a schematic diagram illustrating the audio-data transmitting method according to an embodiment of the invention.

FIG. 2 is a schematic diagram illustrating the audio-data transmitting method according to an embodiment of the invention. In one embodiment, the speaker 280 transmits or plays the start-up audio signal at the period T1. For example, the frequency of the start-up audio signal is in the spacing frequency band X1, and the period T1 includes four units of time. Afterwards, the speaker 280 plays four sub-audio signals which relate to the second encoding signal CS2 at the period T2. The frequencies of four sub-audio signals are at the four sub-frequency bands F1, F2, F3 and F4. For example, the frequency within one sub-frequency band represent 3 bits, therefore, 12 bits could be played within a unit of time. Since the second encoding signal CS2 is 24 bits, it will be played at the period T2 which includes two units of time. Afterwards, the speaker 280 plays four sub-audio signals which relate to the first encoding signal CS1. The frequencies of four sub-audio signals are at the four sub-frequency bands F1, F2, F3 and F4. The length of the period T3 depends on the original data included by the first encoding signal CS1.

In one embodiment, when the speaker 280 plays the four sub-audio signals, it further plays the ending audio signal for indicating that the audio data has been transmitted. The frequency of the ending audio signal is in one of the four spacing frequency bands X1, X2, X3 and X4. In another embodiment, two frequencies of the spacing frequency bands X1, X2, X3 and X4 are determined by the audio-data transmitting method of the present invention to be the symptoms of the audio signal AS which includes the start-up audio signal and the ending audio signal. By arranging symptoms such as the start-up audio signal and the ending audio signal, the trigger point (i.e., timing point) for audio processing could be detected by the receiving terminal.

It should be noted that the speaker 280 plays the control audio signal (for example, the frequency of the control audio signal is in the spacing frequency band X4) on each of the periods T1, T2 and T3. Therefore, other electronic devices could detect that they are playing the audio signal AS to prevent the more than two electronic devices from playing audio signals simultaneously and to avoid the error and collision of the audio-data transmission. As such, the audio-data transmitting system 100 and its method provided by the present invention can improve the speed of data transmission through the effective modulation of divided frequency bands and simultaneously transmitting with multiple frequencies. In addition, the method improves the accuracy of data transmission by combining the error detection and correction encoding, and also reduces the risk of data being stolen and improves the security of data transmission through defining the package by itself. By synergizing the above functions, users can utilize the audio for wirelessly transmitting data over short distances between different electronic devices.

Figure 3A:
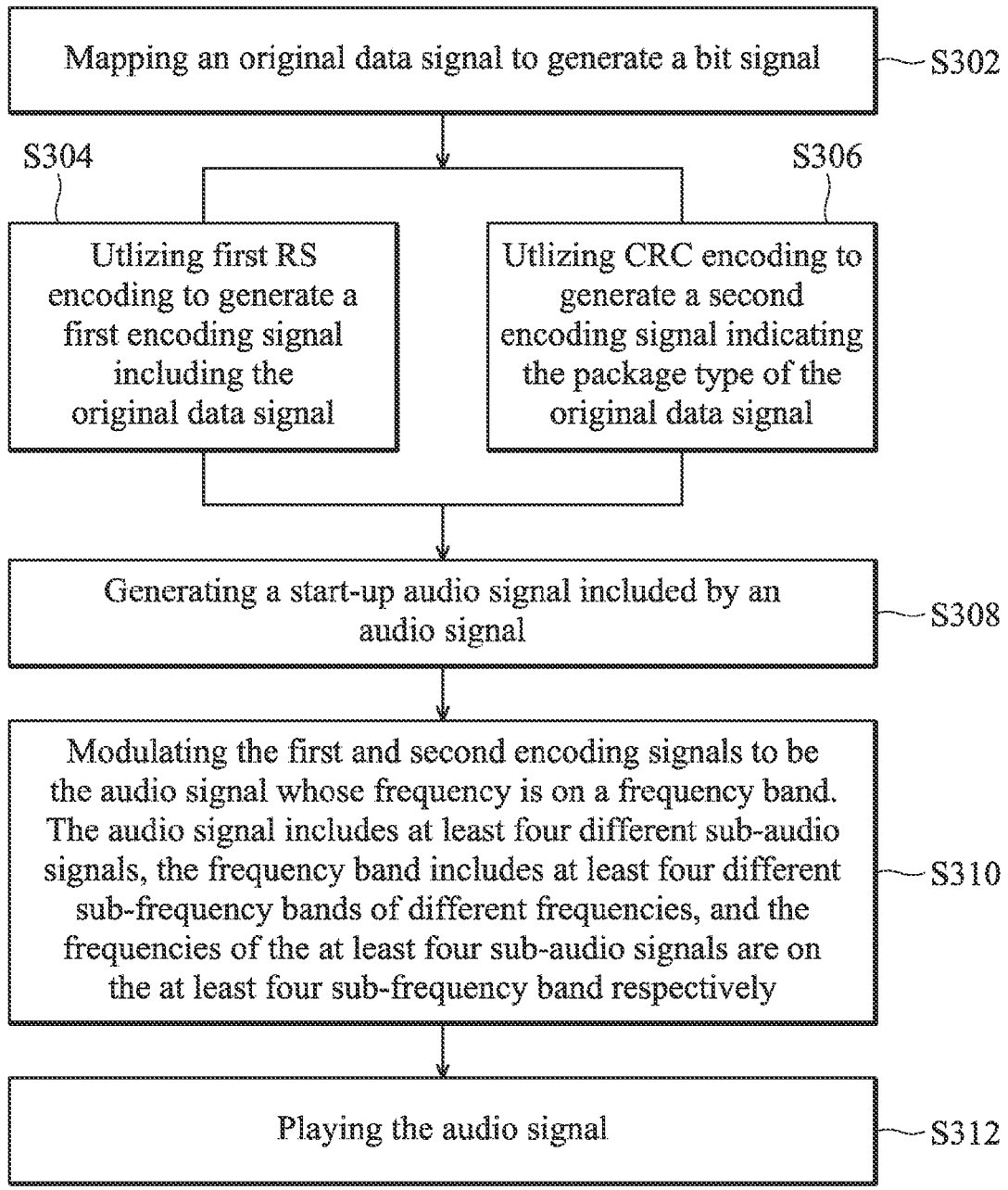
FIG. 3A is a flow chart illustrating the audio-data transmitting method according to an embodiment of the invention.

FIG. 3A is a flow chart illustrating the audio-data transmitting method according to an embodiment of the invention. First, in step S302, an original data signal is mapped to generate a bit signal BS, and steps S304 and S306 are executed. In step S304, the first RS encoding is utilized to generate a first encoding signal CS1 including the original data signal. In step S306, the CRC encoding is utilized to generate a second encoding signal CS2 which indicates the package type of the original data signal. Afterwards, in step S308, the first encoding signal CS1 and the second encoding signal CS2 are modulated to become an audio signal AS whose frequency is on a frequency band. The audio signal AS includes at least four different sub-audio signals, the frequency band includes at least four different sub-frequency bands F1, F2, F3 and F4 of different frequencies, and the frequencies of the sub-audio signals are on the respective sub-frequency bands F1, F2, F3 and F4. The methods about performing modulation and frequency mapping to generate the audio signal AS have been illustrated before, and will not be repeated here. Afterwards, in step S310, the audio signal AS including a start-up audio signal is generated. Afterwards, in step S312, the audio signal AS is played. It should be noted that, in one embodiment, a control audio signal is further generated, and the control audio signal is in a spacing frequency band which is different from the at least four sub-frequency bands F1, F2, F3 and F4. In another embodiment, the start-up audio signal and the control audio signal are simultaneously played in advance, and the control audio signal and the audio signal including the at least four different sub-audio signals are later played simultaneously.

Figure 3B:
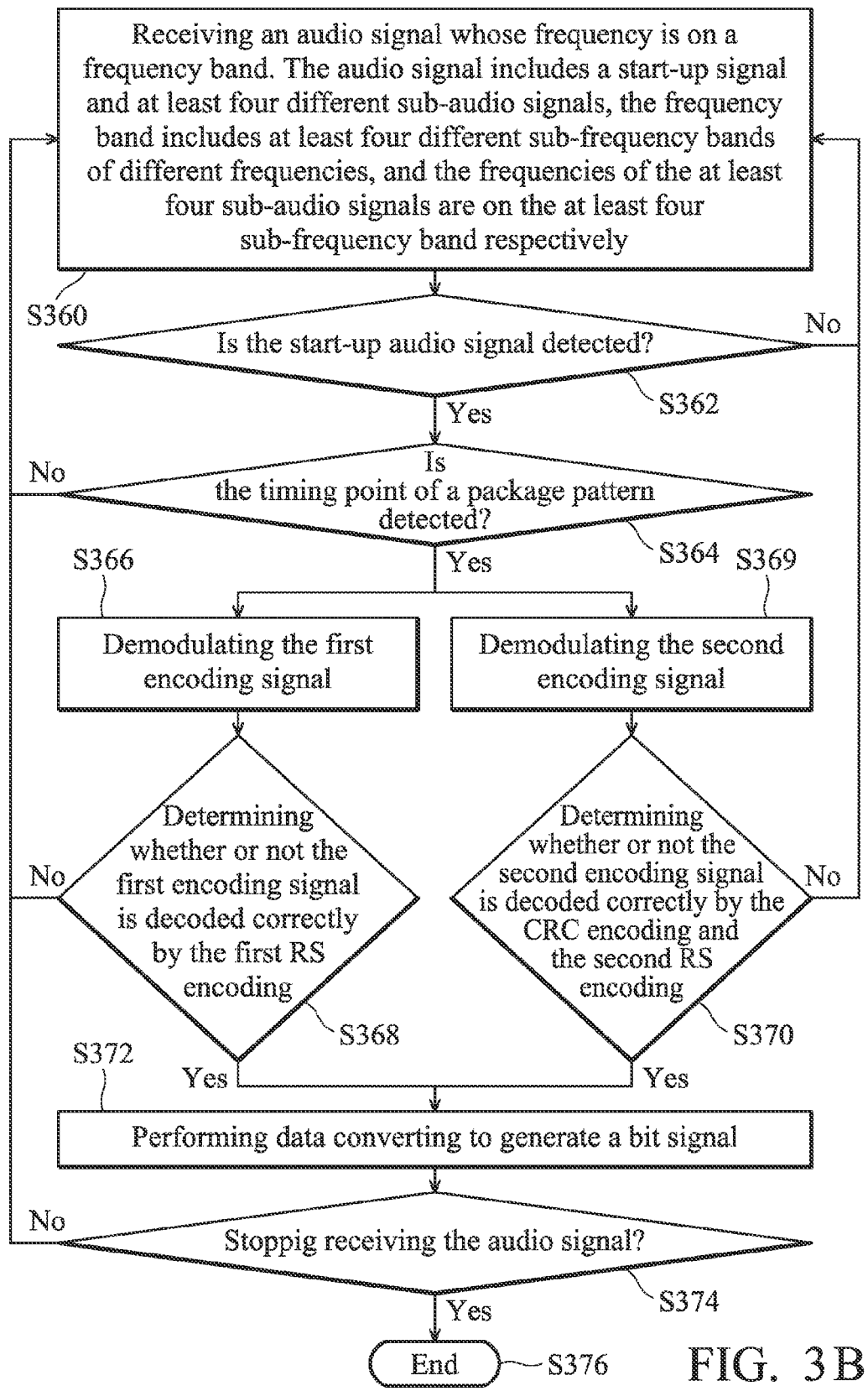
FIG. 3B another flow chart illustrating the audio-data transmitting method according to an embodiment of the invention.

FIG. 3B another flow chart illustrating the audio-data transmitting method according to an embodiment of the invention. First, in step S360, an audio signal AS is received whose frequency is on a frequency band. The audio signal AS includes a start-up signal and at least four different sub-audio signals, the frequency band includes at least four different sub-frequency bands F1, F2, F3 and F4 of different frequencies, and the frequencies of the at least four sub-audio signals are on the at least four sub-frequency bands F1, F2, F3 and F4 respectively. Afterwards, in step S362, whether or not the start-up audio signal is detected is determined. If the start-up audio signal is detected, step S364 is executed. If the start-up audio signal is not detected, step S360 is executed. In step S364, whether or not the timing point of a package pattern is detected is determined. If the timing point of a package pattern is not detected, step S360 is executed. If the timing point of a package pattern is detected, steps S366 and S369 are executed. In step S366, the first encoding signal CS1 is demodulated. Afterwards, in step S368, whether or not the first encoding signal is decoded correctly by the first RS encoding is determined. If the first encoding signal is not decoded correctly by the first RS encoding, step S360 is executed. If the first encoding signal is decoded correctly by the first RS encoding, step S372 is executed.

In addition, the second encoding signal CS2 is demodulated in step S369. Afterwards, in step S370, whether or not the second encoding signal CS2 is decoded correctly by the CRC encoding and the second RS encoding is determined. If the second encoding signal CS2 is not decoded correctly by the CRC encoding and the second RS encoding, step S360 is executed. If the second encoding signal CS2 is decoded correctly by the CRC encoding and the second RS encoding, step S372 is executed. In step S372, the data conversion is performed on the first encoding signal CS1 and the second encoding signal CS2 to generate a bit signal BS. Afterwards, in step S374, whether or not the receiving of the audio signal AS is stopped. If the receiving of the audio signal AS is not stopped, step S360 is executed. If the receiving of the audio signal AS is stopped, step S376 is executed for ending the audio-data transmitting method. It should be noted that, in one embodiment, FIG. 3A illustrates the audio-data transmitting method for a transmitting terminal (such as the first electronic device 200), and FIG. 3B illustrates the audio-data transmitting method for a receiving terminal (such as the second electronic device 300).

Use of ordinal terms such as "first", "second", "third", etc., in the claims to modify a claim element does not by itself connote any priority, precedence, or order of one claim element over additional or the temporal order in which acts of a method are performed, but are used merely as labels to distinguish one claim element having a certain name from additional element having the same name (but for use of the ordinal term) to distinguish the claim elements. While the invention has been described by way of example and in terms of the preferred embodiments, it is to be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An audio-data transmitting system, comprising:
a channel encoder, utilized to receive and encode a bit signal for generating an encoding signal;
a data modulator, utilized to receive the encoding signal and modulate the encoding signal to become an audio signal whose frequency is on a frequency band, wherein the audio signal includes at least four different sub-audio signals, the frequency band includes at least four different sub-frequency bands of different frequencies, and the frequencies of the at least four sub-audio signals are on the at least four sub-frequency bands respectively; and
a speaker, utilized to play the audio signal which includes the at least four different sub-audio signals simultaneously, wherein the audio signal comprises a start-up audio signal, a frequency of the start-up audio signal is in a first spacing frequency band, and the first spacing frequency band is different from the at least four sub-frequency bands.

2. The audio-data transmitting system as claimed in claim 1, wherein the encoding signal comprises a first encoding signal of an original data signal and a second encoding signal for indicating a package type of the original data signal.

3. The audio-data transmitting system as claimed in claim 2, wherein the channel encoder generates the first encoding signal by utilizing a first Reed-Solomon (RS) encoding, and generates the second encoding signal by utilizing a cyclic redundancy check (CRC) encoding and a second RS encoding.

4. The audio-data transmitting system as claimed in claim 2, wherein the speaker simultaneously plays the four sub-audio signals relating the second encoding signal, and simultaneously plays the four sub-audio signals relating the first encoding signal afterwards.

5. The audio-data transmitting system as claimed in claim 1, wherein the frequency of the frequency band is about 18000Hz to 20000Hz.

6. The audio-data transmitting system as claimed in claim 1, wherein the audio signal comprises a control audio signal for preventing an audio collision, a frequency of the control audio signal is in a second spacing frequency band, and the second spacing frequency band is different from the at least four sub-frequency bands and the first spacing frequency band.

7. The audio-data transmitting system as claimed in claim 6, wherein the speaker simultaneously plays the start-up audio signal and the control audio signal, and simultaneously plays the control audio signal and the at least four sub-audio signals afterwards.

8. An audio-data transmitting method, comprising:
receiving and encoding a bit signal for generating an encoding signal;
receiving the encoding signal;
modulating the encoding signal to become an audio signal whose frequency is on a frequency band, wherein the audio signal includes at least four different sub-audio signals, the frequency band includes at least four different sub-frequency bands of different frequencies, and the frequencies of the at least four sub-audio signals are on the at least four sub-frequency bands respectively; and
playing the audio signal which includes the at least four different sub-audio signals simultaneously, wherein the audio signal comprises a start-up audio signal, a frequency of the start-up audio signal is in a first spacing frequency band, and the first spacing frequency band is different from the at least four sub-frequency bands.

9. The audio-data transmitting method as claimed in claim 8, wherein in the step of generating the encoding signal, the encoding signal comprises a first encoding signal of an original data signal and a second encoding signal for indicating a package type of the original data signal.

10. The audio-data transmitting method as claimed in claim 9, wherein in the step of generating the encoding signal, the first encoding signal is generated by utilizing a first Reed-Solomon (RS) encoding, and the second encoding signal is generated by utilizing a cyclic redundancy check (CRC) encoding and a second RS encoding.

11. The audio-data transmitting method as claimed in claim 9, wherein in the step of playing the audio signal which includes the at least four different sub-audio signals simultaneously, the four sub-audio signals relating the second encoding signal are played simultaneously, and the four sub-audio signals relating the first encoding signal are played simultaneously afterwards.

12. The audio-data transmitting method as claimed in claim 8, wherein the frequency of the frequency band is about 18000 Hz to 20000 Hz.

13. The audio-data transmitting method as claimed in claim 8, wherein the audio signal comprises a control audio signal for preventing an audio collision, a frequency of the control audio signal is in a second spacing frequency band, and the second spacing frequency band is different from the at least four sub-frequency bands and the first spacing frequency band.

14. The audio-data transmitting method as claimed in claim 13, wherein the start-up audio signal and the control audio signal are simultaneously played, and the control audio signal and the at least four sub-audio signals are simultaneously played afterwards.

* * * * *